(12) United States Patent
Schultz et al.

(10) Patent No.: US 7,392,496 B1
(45) Date of Patent: Jun. 24, 2008

(54) DEVICE FOR AVOIDING TIMING VIOLATIONS RESULTING FROM PROCESS DEFECTS IN A BACKFILLED METAL LAYER OF AN INTEGRATED CIRCUIT

(75) Inventors: Richard T. Schultz, Fort Collins, CO (US); Thomas R. O'Brien, Windsor, CO (US)

(73) Assignee: LSI Corporation, Milpitas, CA (US)

( * ) Notice: Subject to any disclaimer, the term of this patent is extended or adjusted under 35 U.S.C. 154(b) by 81 days.

(21) Appl. No.: 11/538,187

(22) Filed: Oct. 3, 2006

(51) Int. Cl.
*G06F 17/50* (2006.01)
(52) U.S. Cl. .............................. 716/10; 716/6
(58) Field of Classification Search .................... 716/6, 716/10
See application file for complete search history.

(56) References Cited

U.S. PATENT DOCUMENTS 6,751,785 B1 * 6/2004 Oh ............................... 716/10
6,951,007 B2 * 9/2005 Kaida ........................... 716/12
2003/0177464 A1 * 9/2003 Takechi et al. ................. 716/10

* cited by examiner

*Primary Examiner*—Vuthe Siek
*Assistant Examiner*—Aric Lin
(74) *Attorney, Agent, or Firm*—Eric James Whitesell

(57) ABSTRACT

A method and firmware for avoiding timing violations resulting from process defects in a backfilled metal layer of an integrated circuit includes steps of receiving as input timing information for an integrated circuit design including at least one metal layer and a plurality of signal wires and dummy metal wires in the metal layer, finding at least one of a setup time and a hold time for each signal wire in the metal layer from the timing information, identifying a timing-critical signal wire from at least one of the setup time and the hold time for one of the signal wires that would produce a timing violation in the signal wire when the signal wire is shorted to a dummy metal wire by a process defect in the metal layer, calculating at least one of a wire width, a fracture interval, and a spacing for modifying the dummy metal wire to avoid the timing violation in the timing-critical signal wire, and generating as output at least one of the wire width and the fracture interval for the dummy metal wire.

18 Claims, 10 Drawing Sheets

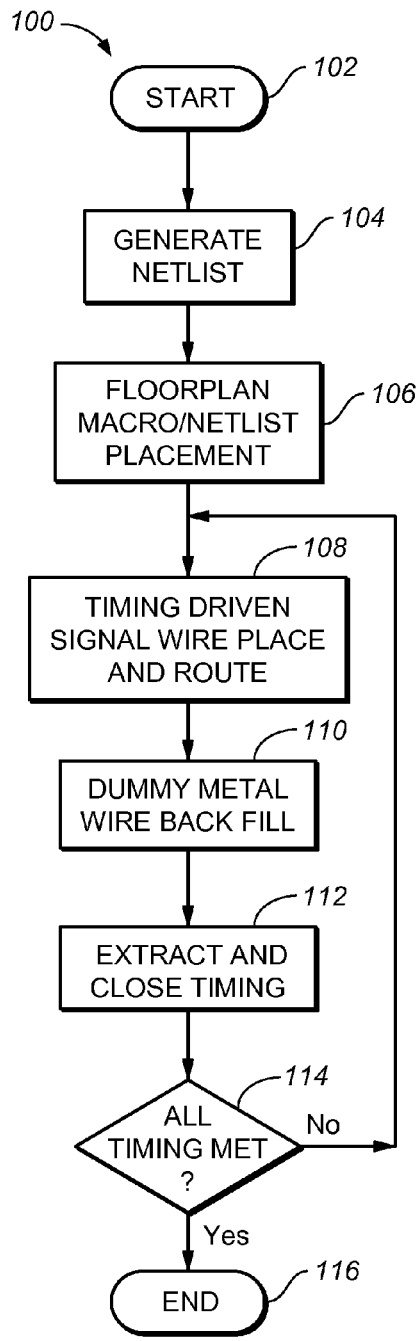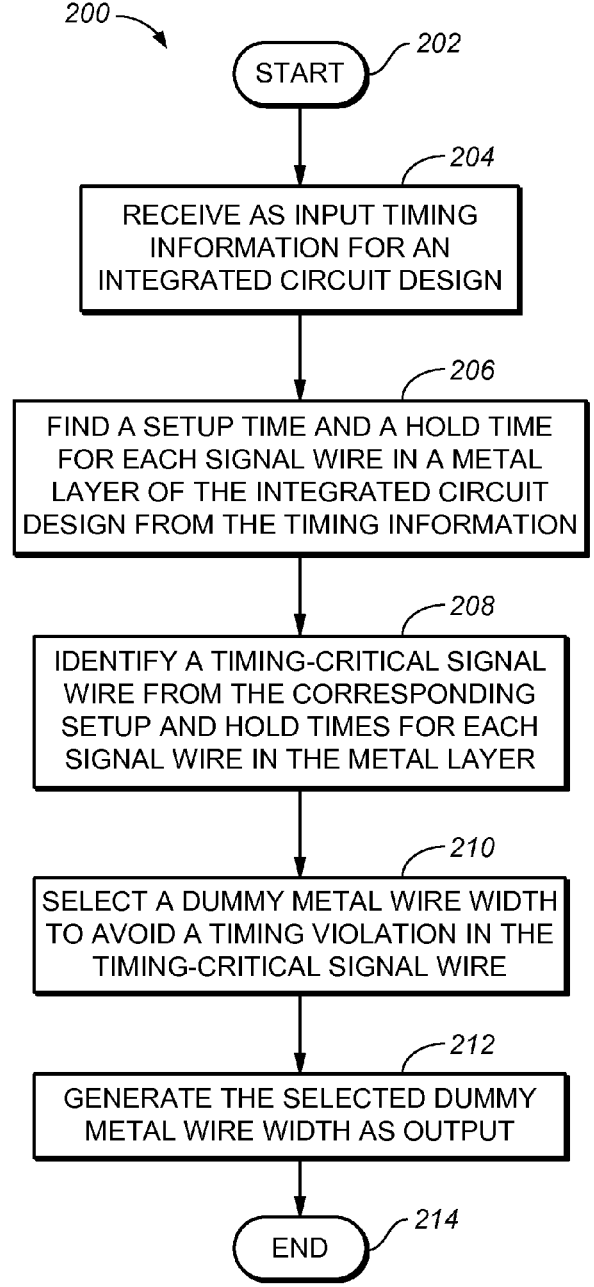
FIG. 1
(PRIOR ART)
FIG. 2

DEVICE FOR AVOIDING TIMING VIOLATIONS RESULTING FROM PROCESS DEFECTS IN A BACKFILLED METAL LAYER OF AN INTEGRATED CIRCUIT

BACKGROUND OF THE INVENTION

1. Field of the Invention

The present invention is directed to the design and manufacture of integrated circuits. More specifically, but without limitation thereto, the present invention is directed to a method and computer program for placing fill wires in an integrated circuit design.

2. Description of Related Art

In recent semiconductor manufacturing technology, copper wires or traces are typically used to conduct signals within each net in an integrated circuit die. As the net density increases, process restrictions are imposed on the metal to oxide ratio and the uniformity of distribution of the copper metal on the surface of the die. These process restrictions are a consequence of forming the metal traces on the die. The metal traces are made by cutting trenches into a surface oxide layer of the die, filling the trenches and the die surface with copper metal, and polishing the surface of the die to just below the top of the trenches. The copper-filled trenches constitute the traces that interconnect the cells of each net.

The rate of material removal during the polishing process is dependent on the metal density, that is, the ratio of copper to oxide on the surface of the die. If the metal density is not uniform across the die, then the traces will be thinner in the high density areas than in the low density areas. The varying trace thickness presents problems in net timing modeling and may result in performance failures in the manufactured die. To maintain a uniform trench height and corresponding trace thickness, the distribution of copper metal across the surface of the die must be kept uniform within a controlled tolerance.

SUMMARY OF THE INVENTION

In one aspect of the present invention, a method of avoiding timing violations resulting from process defects in a backfilled metal layer of an integrated circuit die includes steps of:

receiving as input timing information for an integrated circuit design including at least one metal layer and a plurality of signal wires and dummy metal wires in the metal layer;

finding at least one of a setup time and a hold time for each signal wire in the metal layer from the timing information;

identifying a timing-critical signal wire from at least one of the setup time and the hold time for one of the signal wires that would produce a timing violation in the signal wire when the signal wire is shorted to a dummy metal wire by a process defect in the metal layer;

calculating at least one of a wire width, a fracture interval, and a spacing for modifying the dummy metal wire to avoid the timing violation in the timing-critical signal wire; and generating as output at least one of the wire width and the fracture interval for the dummy metal wire.

In another aspect of the present invention, a computer readable storage medium tangibly embodies instructions that when executed by a computer implement a method for avoiding timing violations resulting from process defects in a backfilled metal layer of an integrated circuit, the method including steps of:

receiving as input timing information for an integrated circuit design including at least one metal layer and a plurality of signal wires and dummy metal wires in the metal layer;

finding at least one of a setup time and a hold time for each signal wire in the metal layer from the timing information;

identifying a timing-critical signal wire from at least one of the setup time and the hold time for one of the signal wires that would produce a timing violation in the signal wire when the signal wire is shorted to a dummy metal wire by a process defect in the metal layer;

calculating at least one of a wire width, a fracture interval, and a spacing for modifying the dummy metal wire to avoid the timing violation in the timing-critical signal wire; and generating as output at least one of the wire width and the fracture interval for the dummy metal wire.

The term "firmware" is used herein to mean "a computer readable storage medium tangibly embodying instructions that when executed by a computer implement a method".

BRIEF DESCRIPTION OF THE DRAWINGS

The present invention is illustrated by way of example and not limitation in the accompanying figures, in which like references indicate similar elements throughout the several views of the drawings, and in which:

FIG. 1 illustrates a flow chart of a method for backfilling a metal layer of an integrated circuit according to the prior art;

FIG. 2 illustrates a flow chart of a method of avoiding timing violations resulting from process defects in a backfilled metal layer of an integrated circuit for timing-critical nets by modifying the width of the dummy metal wires;

Figure 3:
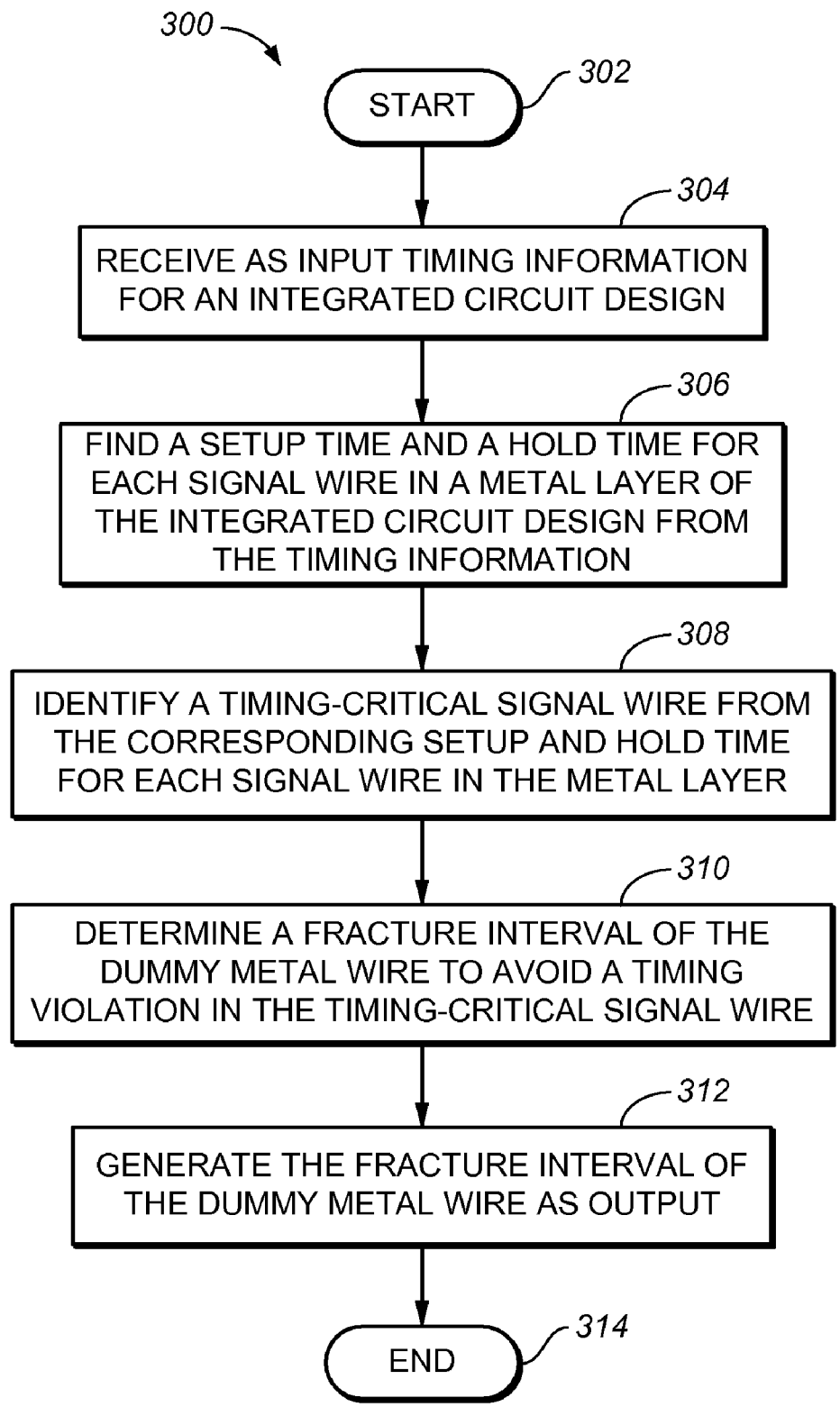
FIG. 3 illustrates a flow chart of a method for avoiding timing violations resulting from process defects in a backfilled metal layer of an integrated circuit for timing-critical nets by fracturing the dummy metal wires.

Elements in the figures are illustrated for simplicity and clarity and have not necessarily been drawn to scale. For example, the dimensions of some elements in the figures may be exaggerated relative to other elements to point out distinctive features in the illustrated embodiments of the present invention.

DESCRIPTION OF THE ILLUSTRATED EMBODIMENTS

In previous methods used for maintaining uniform metal density across the surface of an integrated circuit die, dummy metal wires are used to fill less dense areas on the die surface.

FIG. 1 illustrates a flow chart 100 of a method for dummy metal backfilling a metal layer of an integrated circuit according to the prior art.

Step 102 is the entry point of the flow chart 100.

In step 104, a netlist is generated for the integrated circuit design.

In step 106, a floorplan is generated from the netlist to place macro blocks and the associated routing between the macro blocks on the integrated circuit die.

In step 108, the cells within the macro blocks are placed and routed to satisfy the timing requirements of the integrated circuit design.

In step 110, each of the metal layers in the integrated circuit design is backfilled with dummy metal wires in the empty routing tracks to achieve a uniform metal density across the surface of the metal layer. Dummy metal wires are generally not connected to cells, to signal wires, or to other dummy metal wires.

In step 112, a parasitic extraction and timing closure is performed to verify the timing performance of the chip layout.

In step 114, if all timing requirements are met, the method continues from step 116. Otherwise, the method continues from step 108 until all timing requirements are met.

Step 116 is the exit point of the flow chart 100.

A problem with the method of backfilling a metal layer of an integrated circuit illustrated in FIG. 1 is that process defects occasionally occur in the fabrication of the integrated circuit die that short the signal wires to the dummy wires, adding capacitance to the signal wires. The added capacitance may result in a timing violation in one or more signal wires that is not detected by the test vectors used to verify the chip performance. Consequently, a performance failure of the integrated circuit may occur in a customer application. The following description provides a solution to the problem and may also provide additional advantages. In addition to capacitance, the shorted dummy metal wires may add inductance to the signal wire. Accordingly, the following references to capacitance implicitly include inductance.

In one aspect of the present invention, a method of avoiding timing violations resulting from process defects in a backfilled metal layer of an integrated circuit die includes steps of:

receiving as input timing information for an integrated circuit design including at least one metal layer and a plurality of signal wires and dummy metal wires in the metal layer;

finding at least one of a setup time and a hold time for each signal wire in the metal layer from the timing information;

identifying a timing-critical signal wire from at least one of the setup time and the hold time for one of the signal wires that would produce a timing violation in the signal wire when the signal wire is shorted to a dummy metal wire by a process defect in the metal layer;

calculating at least one of a wire width, a fracture interval, and a spacing for modifying the dummy metal wire to avoid the timing violation in the timing-critical signal wire; and generating as output at least one of the wire width and the fracture interval for the dummy metal wire.

FIG. 2 illustrates a flow chart 200 of a method of avoiding timing violations resulting from process defects in a backfilled metal layer of an integrated circuit for timing-critical nets modifying the width of the dummy metal wires.

Step 202 is the entry point of the flow chart 200.

In step 204, timing information for an integrated circuit design is received as input, for example, from the parasitic extraction and timing closure performed in step 112 of FIG. 1. The integrated circuit design includes at least one metal layer with signal wires and dummy metal wires in the metal layer.

In step 206, a setup time and a hold time is found from the timing information for each signal wire in the metal layer according to well-known integrated circuit design techniques.

In step 208, a timing-critical signal wire is identified from the corresponding setup and hold time for one of the signal wires that would produce a timing violation in the signal wire when the signal wire is shorted to one or more dummy metal wires by a process defect in the metal layer. A timing-critical signal wire is a signal wire having a setup time or a hold time such that the added capacitance of the dummy metal wire would result in a timing violation if the dummy metal wire were shorted to the signal wire by a process defect. The added capacitance of the dummy metal wire may be inserted in the same timing model used for the parasitic extraction and timing closure to determine whether a timing violation would occur if the dummy metal wire were shorted to the signal wire by a process defect.

In one embodiment, all dummy metal wires within a selected radius from the signal wire may be considered in the identification of the timing-critical signal wires. The value of the radius may be set, for example, as a program parameter or a user input. The value of the radius may be determined, for example, from the process defect size distribution measured from the fabrication facility for a specific technology. For example, the radius may have a value of one routing track width, two routing track widths, or more.

In step 210, a dummy metal wire width is selected to avoid a timing violation in the timing-critical signal wire, for example, from a lookup table of dummy metal wire widths that includes pre-determined values of capacitance for each wire width. The table of dummy metal wire widths preferably includes a sufficient number of widths to meet the metal density uniformity requirements of the manufacturing technology without resulting in a design database that has an unmanageable size. In one embodiment, the largest dummy metal wire width is selected from the table that does not result in a timing violation in the signal wire if the dummy metal wire is shorted to the signal wire by a process defect.

In one embodiment, if the selected dummy metal wire width conflicts with a signal wire, the next smaller width is selected, and so on. If the new dummy metal wire width conflicts with another dummy metal wire, the other dummy metal wire is removed from the design database.

In step 212, the selected dummy metal wire width is generated as output, for example, to a design tool for modifying the dummy metal wires within the selected radius of the timing-critical signal wire by changing the width of the dummy metal wires in the design database.

Because step 210 is only performed on the timing-signal wires identified in step 208, the increase in processing time added to the design cycle of FIG. 1 is minimized.

Step 214 is the exit point of the flow chart 200.

In another embodiment, the dummy metal wires are fractured to reduce the capacitance added to the signal wire when the signal wire is shorted to the dummy metal wire by a process defect.

FIG. 3 illustrates a flow chart 300 of a method for avoiding timing violations resulting from process defects in a backfilled metal layer of an integrated circuit for timing-critical nets by fracturing the dummy metal wires.

Step 302 is the entry point of the flow chart 300.

In step 304, timing information for an integrated circuit design is received as input, for example, from the parasitic extraction and timing closure performed in step 112 of FIG. 1.

In step 306, a setup time and a hold time is found from the timing information for each signal wire in the metal layer according to well-known integrated circuit design techniques.

In step 308, a timing-critical signal wire is identified from the corresponding setup and hold time for one of the signal wires that would produce a timing violation in the signal wire when the signal wire is shorted to one or more dummy metal wires by a process defect in the metal layer. A timing-critical signal wire is a signal wire having a setup time or a hold time such that the added capacitance of the dummy metal wire would result in a timing violation if the dummy metal wire were shorted to the signal wire by a process defect. The added capacitance of the dummy metal wire may be inserted in the same timing model used for the parasitic extraction and timing closure to determine whether a timing violation would occur if the dummy metal wire were shorted to the signal wire by a process defect.

In one embodiment, all dummy metal wires within a selected radius from the signal wire may be considered in the identification of the timing-critical signal wires. The value of the radius may be set, for example, as a program parameter or a user input. The radius may be determined, for example, from the range of process defect size distribution measured from the fabrication facility for a specific technology. For example, the radius may have a value of one routing track width, two routing track widths, or more.

In step 310, the distance between fracture points, that is, the segment length or fracture interval, is determined from the added capacitance of a segment of the dummy metal wire that spans the fracture interval. The fracture interval may be selected, for example, from a lookup table of dummy metal wire lengths that includes pre-determined values of capacitance for each wire length. The table of dummy metal wire lengths preferably includes a sufficient number of segment lengths to meet the metal density uniformity requirements of the manufacturing technology without resulting in a design database that has an unmanageable size. In one embodiment, the largest fracture interval is selected from the table that does not result in a timing violation in the signal wire if the dummy metal wire segment is shorted to the signal wire by a process defect. In one embodiment, the largest fracture interval that avoids a timing violation in the signal wire if the segment is shorted to the signal wire by a process defect is selected. A shorter fracture interval may be selected, for example, if the selected radius from the signal wire is greater than one routing track, or to anticipate process defects that bridge two adjacent segments of a fractured dummy metal wire and the signal wire. If the fracture interval is too small, however, the size of the design database may become unmanageable.

In step 312, the fracture interval of the dummy metal wire or wires within the selected radius of the timing-critical signal wire is generated as output, for example, to a design tool for modifying the dummy metal wires by performing the fracturing of the dummy metal wires in the design database. Because fracturing the dummy metal wires has little effect on the capacitance of the dummy metal wire as a whole, the overall timing of the integrated circuit design is not significantly changed. Consequently, the timing closure in step 112 of FIG. 1 need not be repeated.

Because steps 310 and 312 are only performed on the signal wires identified in step 308 as timing critical wires, the increase in processing time added to the design cycle of FIG. 1 is minimized.

Step 314 is the exit point of the flow chart 300.

The methods of FIG. 2 and FIG. 3 may also be combined to avoid timing violations in timing-critical signal wires by both selecting a width of the dummy metal wire from a number of different widths and fracturing the dummy metal wire into segments to reduce the added capacitance.

Figure 4:
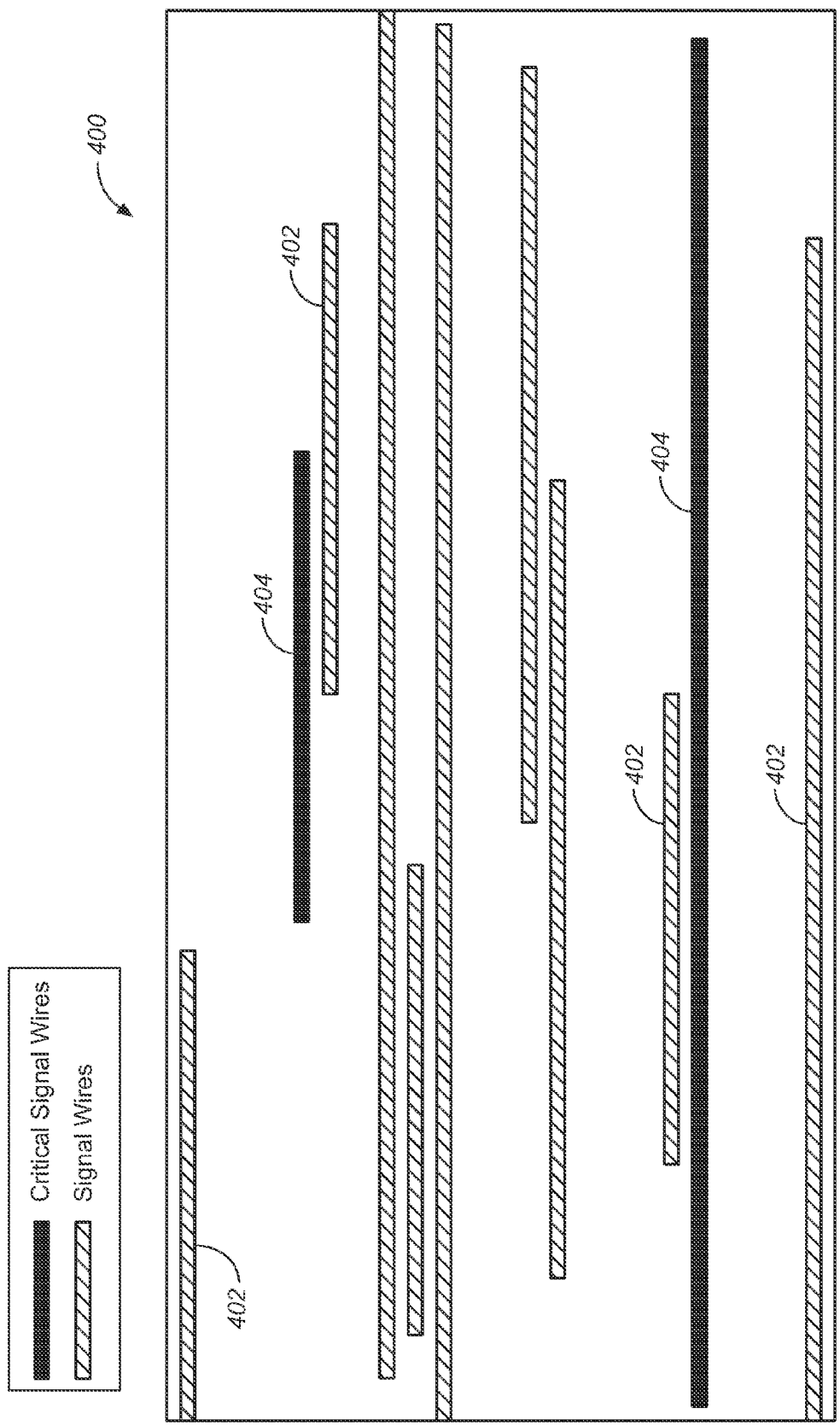
FIG. 4 illustrates a top view of a metal layer of an integrated circuit die with timing-critical signal wires before backfilling with dummy metal wires.

FIG. 4 illustrates a top view 400 of a metal layer of an integrated circuit die with timing-critical signal wires before backfilling with dummy metal wires. Shown in FIG. 4 are signal wires 402 and timing-critical signal wires 404. The metal density of the metal layer in this example is greater in the areas where several signal wires 402 and 404 are routed than in the areas where no signal wires are routed.

Figure 5:
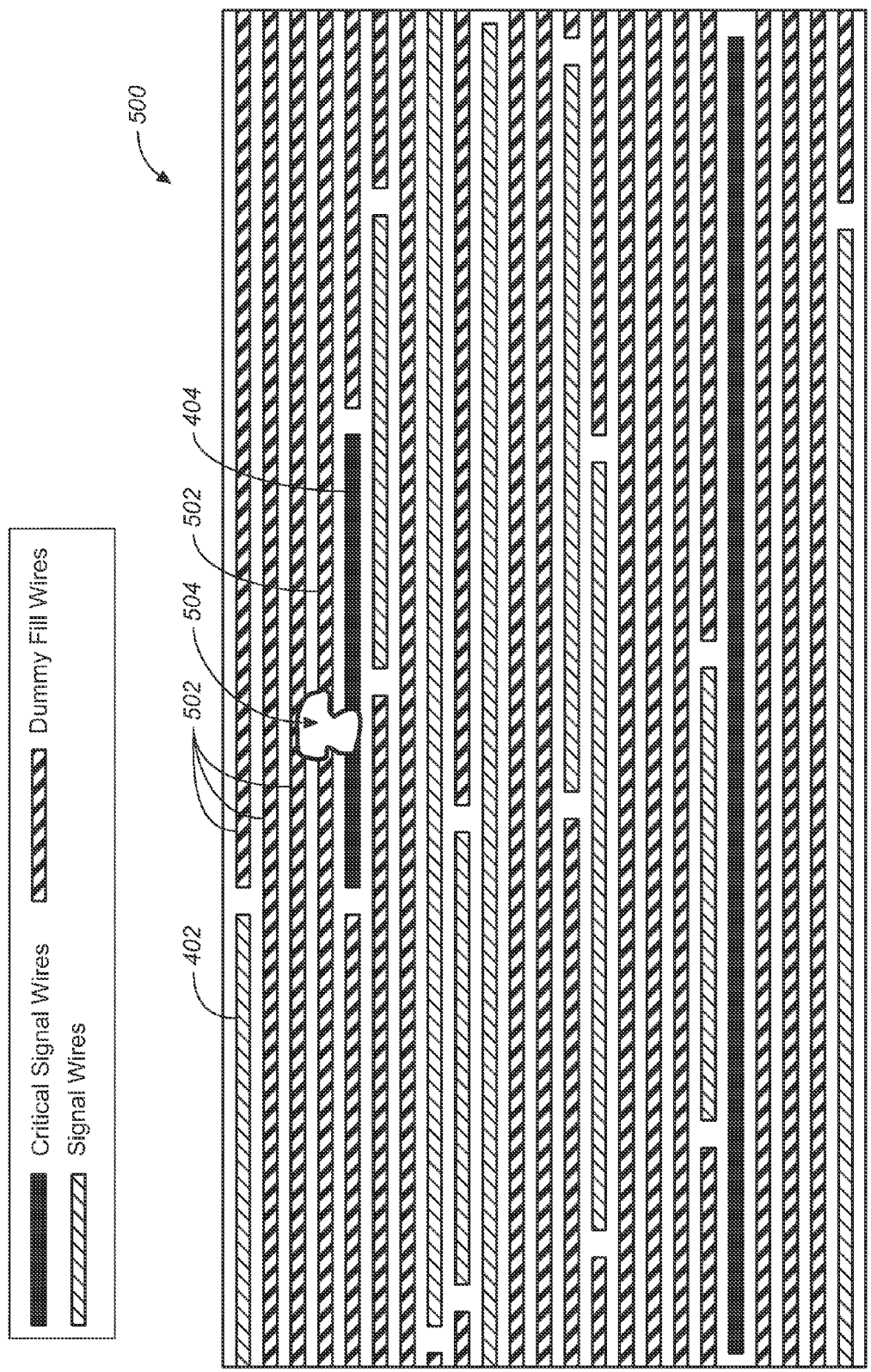
FIG. 5 illustrates a top view of the metal layer of FIG. 4 after backfilling with dummy metal wires.

FIG. 5 illustrates a top view 500 of the metal layer of FIG. 4 after backfilling with dummy metal wires. Shown in FIG. 5 are signal wires 402, timing-critical signal wires 404, dummy metal wires 502, and a process defect 504.

In FIG. 5, the empty routing tracks of the metal layer of FIG. 4 between the signal wires 402 and the timing-critical signal wires 404 are backfilled with the dummy metal wires 502, resulting in a uniform metal density across the metal layer. However, the process defect 504 electrically connects (short-circuits, shorts) two of the dummy metal wires 502 to the timing-critical signal wire 404. As a result, the capacitance of the dummy metal wires 502 shorted by the process defect 504 is coupled to the adjacent timing-critical signal wire 404. The added capacitance from the dummy metal wires 502 results in a timing violation in the timing-critical signal wire 404, and the timing violation may result in a chip failure during operation.

Figure 6:
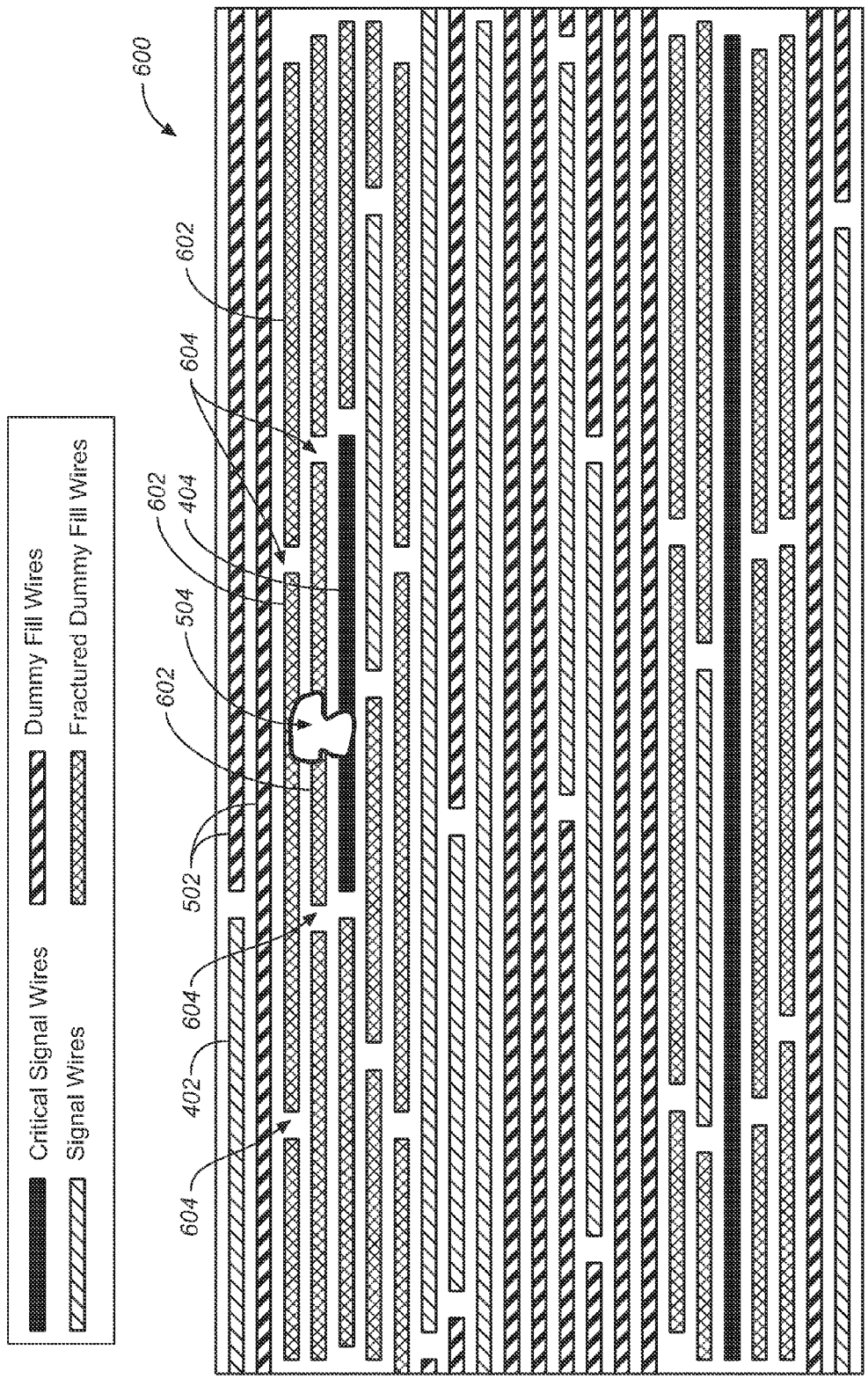
FIG. 6 illustrates a top view of the metal layer of FIG. 5 after fracturing the dummy metal wires.

FIG. 6 illustrates a top view 600 of the metal layer of FIG. 5 after fracturing the dummy metal wires. Shown in FIG. 6 are signal wires 402, timing-critical signal wires 404, dummy metal wires 502, a process defect 504, fractured dummy metal wires 602, and fracture points 604.

In FIG. 6, the fractured dummy metal wires 602 are divided into segments between the fracture points 604. The fractured dummy metal wires 602 couple only the added capacitance of each segment that is shorted to the timing-critical signal wire 404 by the process defect 504, which is less than the capacitance of the non-fractured dummy metal wires 502. The reduced capacitance coupled to the timing-critical signal wire 404 advantageously avoids timing violations that may result from the process defect 504.

Figure 7:
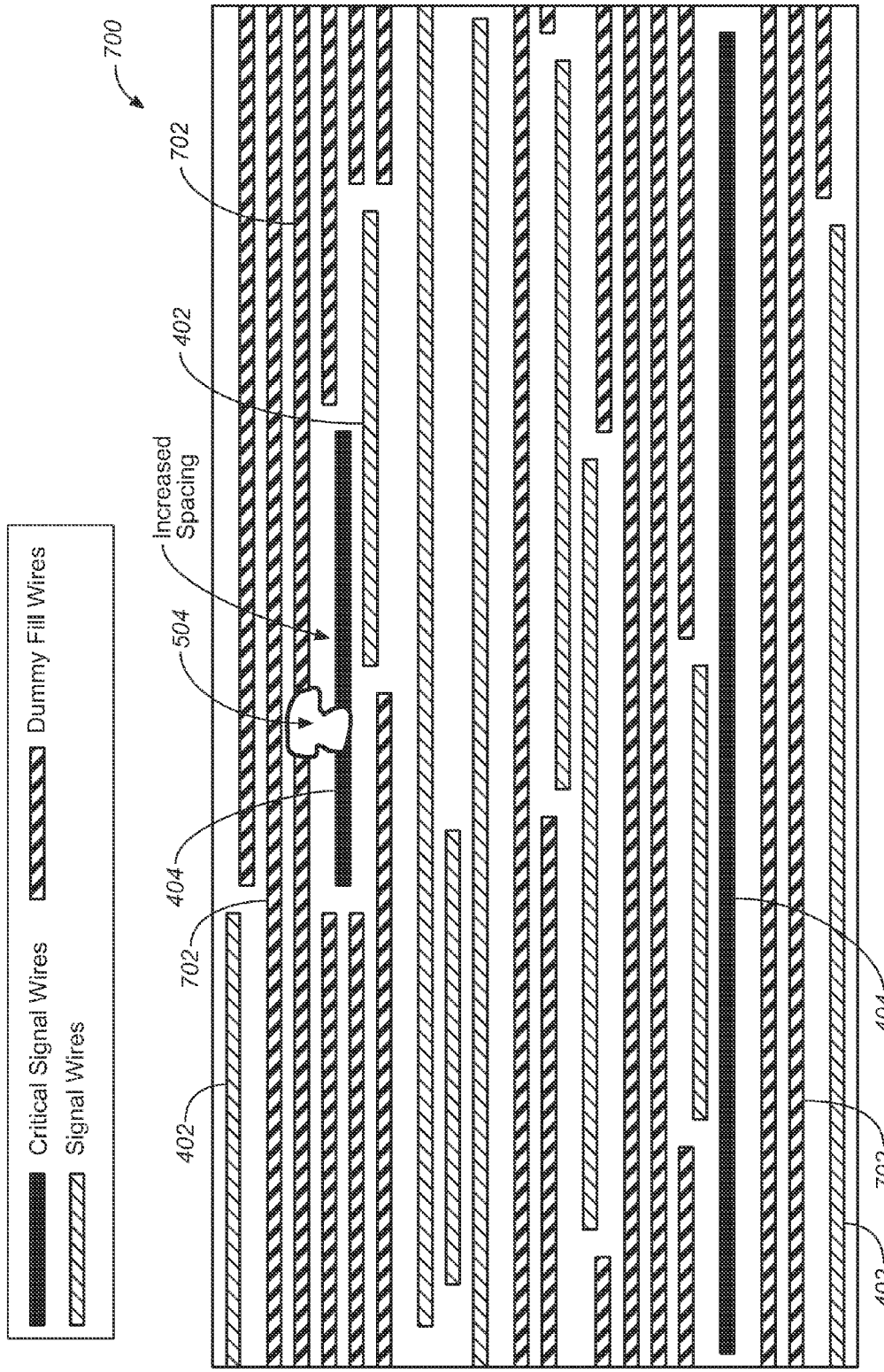
FIG. 7 illustrates a top view of the metal layer of FIG. 5 after backfilling the dummy metal wires with a half-track offset.

FIG. 7 illustrates a top view 700 of the metal layer of FIG. 5 after backfilling the dummy metal wires with a half-track offset. Shown in FIG. 7 are signal wires 402, timing-critical signal wires 404, a process defect 504, and offset dummy metal wires 702.

In FIG. 7, the dummy metal wires 702 are offset from the signal wires 402 and the timing-critical signal wires 404, resulting in increased spacing between the dummy metal wires 702 and the signal wires 402 and the timing-critical signal wires 404. The increased spacing between the signal wires and the dummy metal wires resulting from the offset reduces the likelihood and the number of dummy metal wires that may be shorted to a timing-critical signal wire 404 by the process defect 504.

Figure 8:
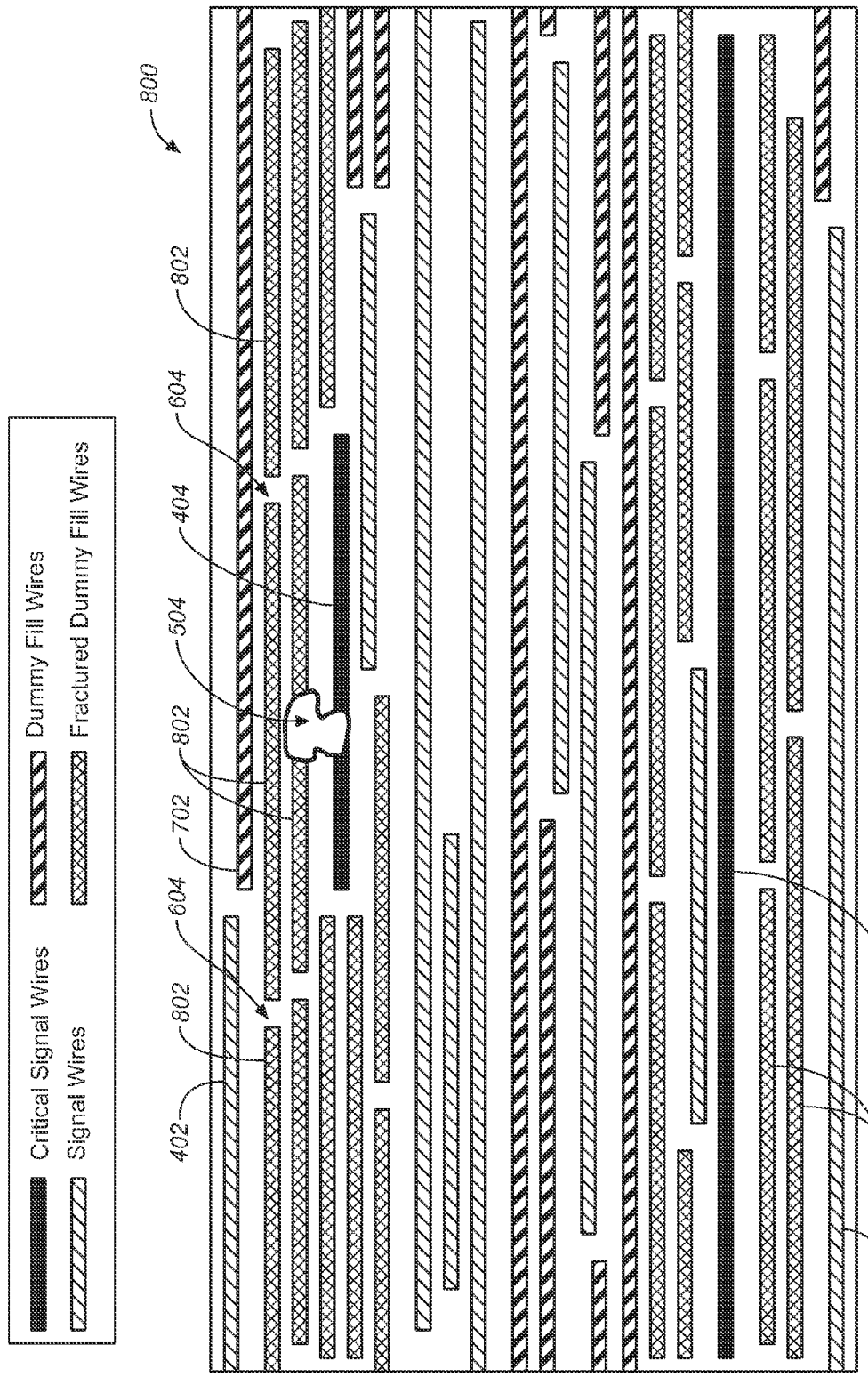
FIG. 8 illustrates a top view of the metal layer of FIG. 7 after fracturing the offset dummy metal wires.

FIG. 8 illustrates a top view 800 of the metal layer of FIG. 7 after fracturing the offset dummy metal wires. Shown in FIG. 8 are signal wires 402, timing-critical signal wires 404, a process defect 504, fracture points 604, and fractured offset dummy metal wires 802.

In FIG. 8, the fractured offset dummy metal wires 802 reduce the capacitance coupled to the timing-critical signal wire 404 shorted to the fractured dummy metal wires 802 by the process defect 504. The reduced capacitance of the fractured dummy metal wire 802 coupled to the timing-critical signal wire 404 advantageously avoids timing violations that may result from the non-fractured dummy metal wires 702.

Figure 9:
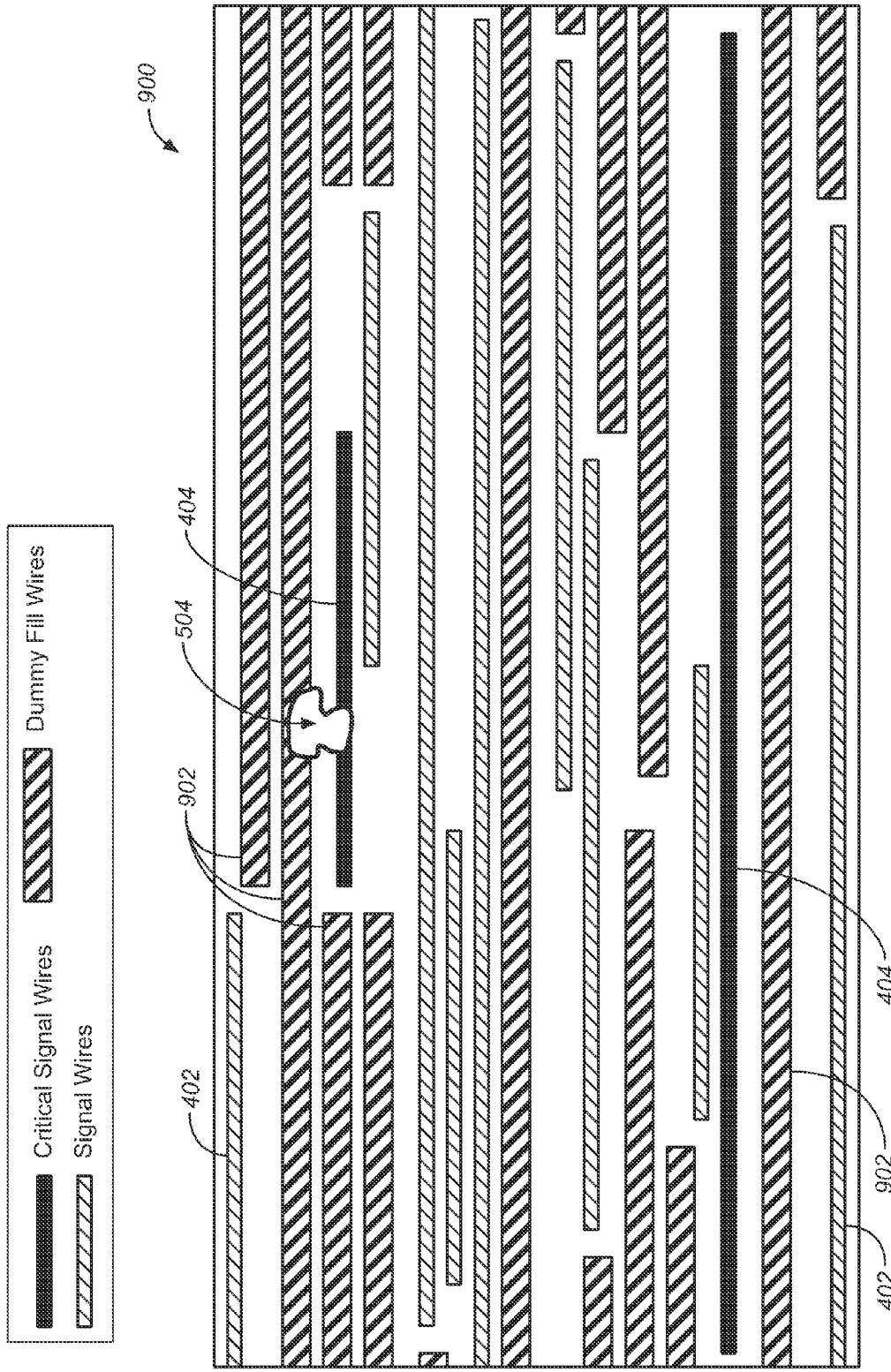
FIG. 9 illustrates a top view of the metal layer of FIG. 4 after backfilling with wide dummy metal wires and double minimum spacing.

FIG. 9 illustrates a top view 900 of the metal layer of FIG. 4 after backfilling with wide dummy metal wires and double minimum spacing. Shown in FIG. 9 are signal wires 402, timing-critical signal wires 404, a process defect 504, and double-spaced wide dummy metal wires 902.

In FIG. 9, the double-spaced wide dummy metal wires 902 result in increased spacing between the double-spaced wide dummy metal wires 902 and the signal wires 402 and the timing-critical signal wires 404. The increased spacing between the double-spaced wide dummy metal wires 902 and the signal wires 402 and between the double-spaced wide dummy metal wires 902 and the timing-critical signal wires 404 reduces the likelihood and the number of dummy metal wires that may be shorted to a timing-critical signal wire 404 by the process defect 504.

Figure 10:
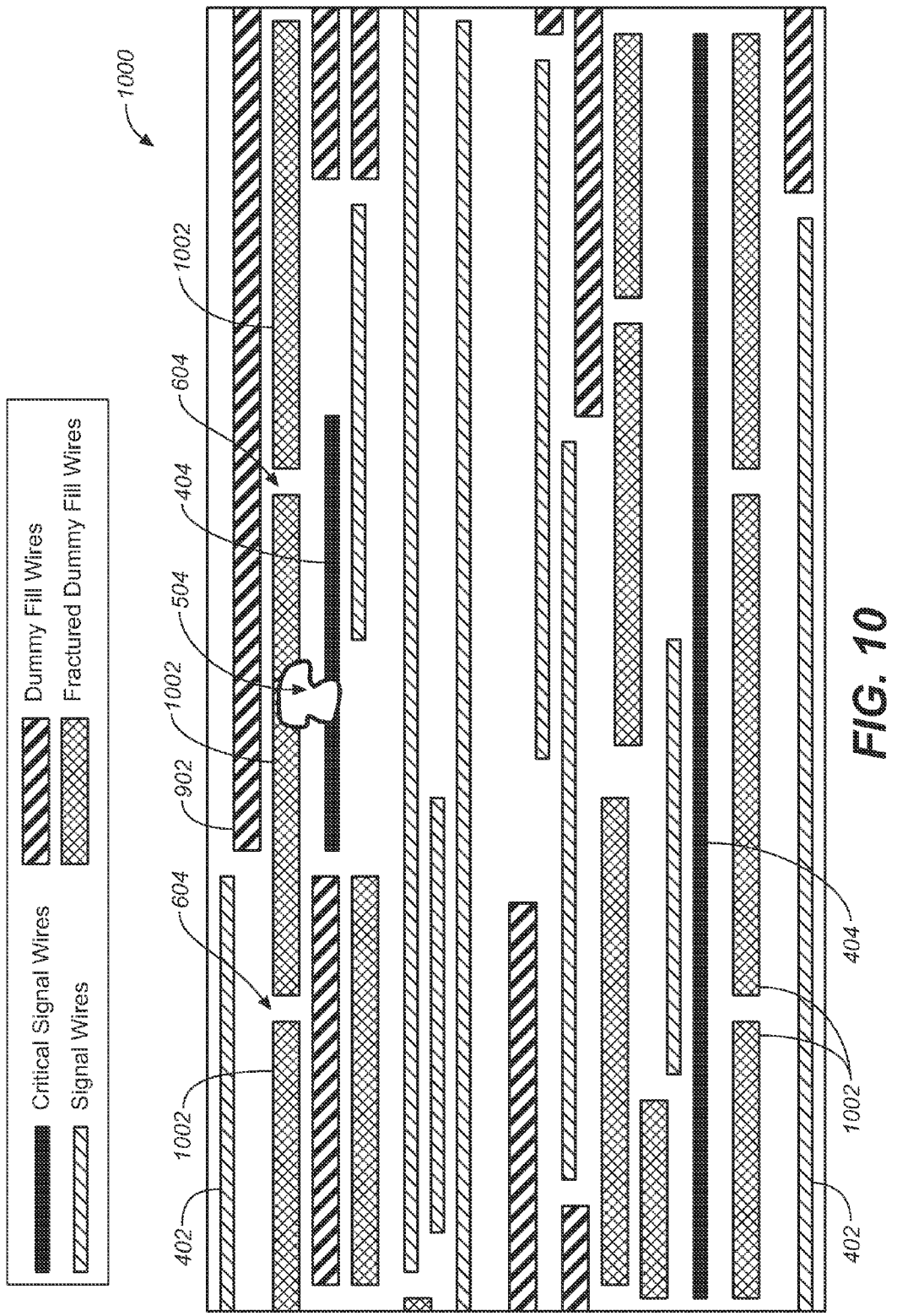
FIG. 10 illustrates a top view of the metal layer of FIG. 9 after fracturing the double-spaced wide dummy metal wires.

FIG. 10 illustrates a top view 1000 of the metal layer of FIG. 9 after fracturing the double-spaced wide dummy metal wires. Shown in FIG. 10 are signal wires 402, timing-critical signal wires 404, a process defect 504, fracture points 604, double-spaced wide dummy metal wires 902, and fractured double-spaced wide dummy metal wires 1002.

In FIG. 10, the fractured double-spaced wide dummy metal wires 1002 are divided into segments between the fracture points 604. The fractured double-spaced wide dummy metal wires 1002 couple only the added capacitance of each segment that is shorted to the timing-critical signal wire 404 by the process defect 504, which is less than the capacitance of the non-fractured dummy metal wires. The reduced capacitance coupled to the timing-critical signal wire 404 advantageously avoids timing violations that may result from the process defect 504.

Although the methods illustrated by the flowchart descriptions above are described and shown with reference to specific steps performed in a specific order, these steps may be combined, sub-divided, or reordered without departing from the scope of the claims. Unless specifically indicated herein, the order and grouping of steps is not a limitation of the present invention.

The flow charts described above may also be implemented by computer program instructions for execution by a computer. The instructions may be tangibly embodied in a disk, a CD-ROM, and other computer readable media according to well known computer programming techniques.

In another embodiment, a computer readable storage medium tangibly embodies instructions that when executed by a computer implement a method of avoiding timing violations resulting from process defects in a backfilled metal layer of an integrated circuit, the method including steps of:

receiving as input timing information for an integrated circuit design including at least one metal layer and a plurality of signal wires and dummy metal wires in the metal layer;

finding at least one of a setup time and a hold time for each signal wire in the metal layer from the timing information;

identifying a timing-critical signal wire from at least one of the setup time and the hold time for one of the signal wires that would produce a timing violation in the signal wire when the signal wire is shorted to a dummy metal wire by a process defect in the metal layer;

calculating at least one of a wire width, a fracture interval, and a spacing for modifying the dummy metal wire to avoid the timing violation in the timing-critical signal wire; and generating as output at least one of the wire width and the fracture interval for the dummy metal wire.

Figure 11:
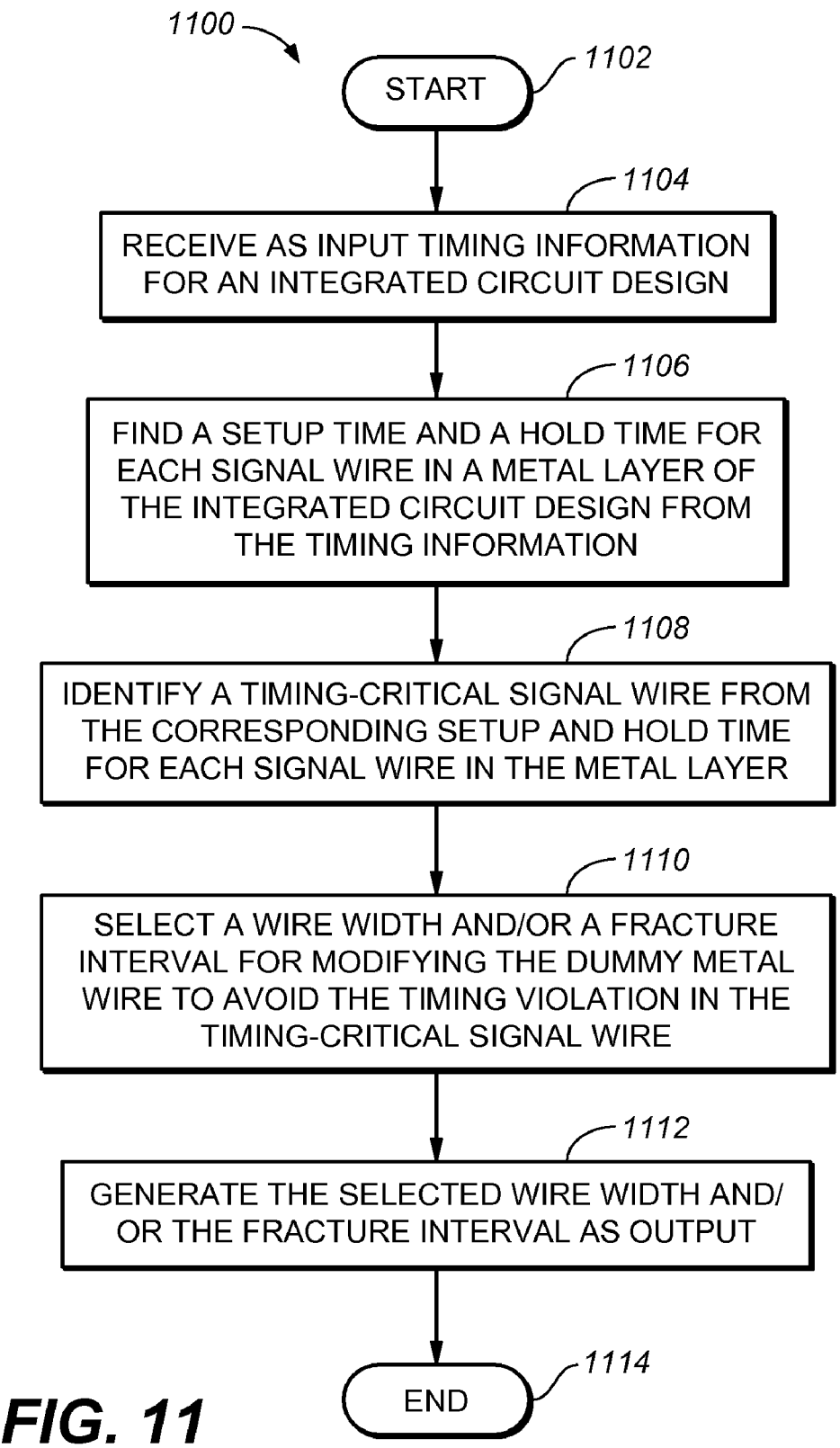
FIG. 11 illustrates a flow chart of a method and firmware for avoiding timing violations resulting from process defects in a backfilled metal layer of an integrated circuit.

FIG. 11 illustrates a flow chart 1100 of a method and firmware for avoiding timing violations resulting from process defects in a backfilled metal layer of an integrated circuit.

Step 1102 is the entry point of the flow chart 1100.

In step 1104, timing information for an integrated circuit design is received as input including at least one metal layer and a plurality of signal wires and dummy metal wires in the metal layer.

In step 1106, at least one of a setup time and a hold time is found from the timing information for each signal wire in the metal layer.

In step 1108, a timing-critical signal wire is identified from the setup time and/or the hold time of one of the signal wires such that the added capacitance of a dummy metal wire produces a timing violation in the signal wire when the signal wire is shorted to the dummy metal wire by a process defect in the metal layer.

In step 1110, a wire width and/or a fracture interval is selected for modifying the dummy metal wire to avoid the timing violation as described above.

In step 1112, the selected wire width and/or the fracture interval is generated as output, for example, to a design tool for modifying the dummy metal wires within the selected radius of the timing-critical signal wire in the design database.

Step 1114 is the exit point of the flow chart 1100.

While the invention herein disclosed has been described by means of specific embodiments and applications thereof, numerous modifications and variations could be made thereto by those skilled in the art without departing from the scope of the invention set forth in the following claims.

The specific embodiments and applications thereof described above are for illustrative purposes only and do not preclude modifications and variations that may be made within the scope of the following claims.

What is claimed is:

1. A method of avoiding timing violations resulting from process defects in a backfilled metal layer of an integrated circuit comprising steps of:
   (a) receiving as input timing information for an integrated circuit design including at least one metal layer and a plurality of signal wires and dummy metal wires in the metal layer;
   (b) finding at least one of a setup time and a hold time for each signal wire in the metal layer from the timing information;
   (c) identifying a timing-critical signal wire from at least one of the setup time and the hold time for one of the signal wires that would produce a timing violation in the signal wire when the signal wire is shorted to a dummy metal wire by a process defect in the metal layer;
   (d) calculating at least one of a wire width, a fracture interval, and a spacing for modifying the dummy metal wire to avoid the timing violation in the timing-critical signal wire; and
   (e) generating as output at least one of the wire width and the fracture interval for the dummy metal wire.

2. The method of claim 1, the dummy metal wire in step (c) comprising multiple dummy metal wires within a selected radius from the signal wire.

3. The method of claim 2, the selected radius being equal to a distance of one or more routing tracks.

4. The method of claim 1, the calculated fracture interval in step (d) being equal to the maximum distance between fracture points that avoids the timing violation.

5. The method of claim 2, the calculated fracture interval in step (d) being equal to the maximum distance between fracture points that avoids the timing violation.

6. The method of claim 1 further comprising routing the dummy metal wires at an offset spacing from the signal wires.

7. The method of claim 6, the offset spacing being equal to half a routing track.

8. The method of claim 1, step (d) comprising selecting the wire width of the dummy metal wire from a table of dummy metal wire widths that includes a capacitance for each dummy metal wire width.

9. The method of claim 1, step (d) comprising selecting the fracture interval of the dummy metal wire from a table of dummy metal wire lengths that includes a capacitance for each dummy metal wire length.

10. A computer readable storage medium tangibly embodying instructions that when executed by a computer implement a method for avoiding timing violations resulting from process defects in a backfilled metal layer of an integrated circuit, the method comprising steps of:
   (a) receiving as input timing information for an integrated circuit design including at least one metal layer and a plurality of signal wires and dummy metal wires in the metal layer;
   (b) finding at least one of a setup time and a hold time for each signal wire in the metal layer from the timing information;
   (c) identifying a timing-critical signal wire from at least one of the setup time and the hold time for one of the signal wires that would produce a timing violation in the signal wire when the signal wire is shorted to a dummy metal wire by a process defect in the metal layer;
   (d) calculating at least one of a wire width, a fracture interval, and a spacing for modifying the dummy metal wire to avoid the timing violation in the timing-critical signal wire; and
   (e) generating as output at least one of the wire width and the fracture interval for the dummy metal wire.

11. The computer readable storage medium of claim 10, the dummy metal wire in step (c) comprising multiple dummy metal wires within a selected radius from the signal wire.

12. The computer readable storage medium of claim 11, the selected radius being equal to a distance of one or more routing tracks.

13. The computer readable storage medium of claim 10, the calculated fracture interval in step (d) being equal to the maximum distance between fracture points that avoids the timing violation.

14. The computer readable storage medium of claim 11, the calculated fracture interval in step (d) being equal to the maximum distance between fracture points that avoids the timing violation.

15. The computer readable storage medium of claim 10 further comprising routing the dummy metal wires at an offset spacing from the signal wires.

16. The computer readable storage medium of claim 15, the offset spacing being equal to half a routing track.

17. The computer readable storage medium of claim 10, step (d) comprising selecting the wire width of the dummy metal wire from a table of dummy metal wire widths that includes a capacitance for each dummy metal wire width.

18. The computer readable storage medium of claim 10, step (d) comprising selecting the fracture interval of the dummy metal wire from a table of dummy metal wire lengths that includes a capacitance for each dummy metal wire length.

* * * * *